US012697639B2

(12) United States Patent
Hirooka

(10) Patent No.: US 12,697,639 B2
(45) Date of Patent: Aug. 4, 2026

(54) GLUE SUPPLY APPARATUS FOR GYPSUM BOARD, GYPSUM BOARD MANUFACTURING APPARATUS, AND GYPSUM BOARD MANUFACTURING METHOD

(71) Applicant: YOSHINO GYPSUM CO., LTD., Tokyo (JP)

(72) Inventor: Yuichi Hirooka, Tokyo (JP)

(73) Assignee: YOSHINO GYPSUM CO., LTD., Tokyo (JP)

(*) Notice: Subject to any disclaimer, the term of this patent is extended or adjusted under 35 U.S.C. 154(b) by 161 days.

(21) Appl. No.: 18/260,399

(22) PCT Filed: Jan. 21, 2022

(86) PCT No.: PCT/JP2022/002253
§ 371 (c)(1),
(2) Date: Jul. 5, 2023

(87) PCT Pub. No.: WO2022/163537
PCT Pub. Date: Aug. 4, 2022

(65) Prior Publication Data

US 2024/0050978 A1 Feb. 15, 2024

(30) Foreign Application Priority Data

Jan. 26, 2021 (JP) ................................ 2021-010483

(51) Int. Cl.
*B05C 5/02* (2006.01)
*B05C 11/04* (2006.01)
(Continued)

(52) U.S. Cl.
CPC .............. *B05C 5/025* (2013.01); *B05C 11/04* (2013.01); *B05C 11/1044* (2013.01); *B05C 11/1047* (2013.01); *B28B 19/0092* (2013.01)

(58) Field of Classification Search
CPC ..... B05C 5/025; B05C 11/04; B05C 11/1044; B05C 11/1047; B28B 19/0092;
(Continued)

(56) References Cited

U.S. PATENT DOCUMENTS 1,859,853 A 5/1932 Thomson
2,806,240 A * 9/1957 Cottar .................... B27G 11/00
15/236.08
(Continued)

FOREIGN PATENT DOCUMENTS

CA 2173894 A * 10/1996 ............. B05B 12/04
CN 207756411 U 8/2018
(Continued)

OTHER PUBLICATIONS

International Search Report for PCT/JP2022/002253 mailed on Mar. 8, 2022.
(Continued)

*Primary Examiner* — S. Behrooz Ghorishi
(74) *Attorney, Agent, or Firm* — IPUSA, PLLC

(57) ABSTRACT

A glue supply apparatus for a gypsum board supplies glue to a board base paper of the gypsum board. The glue supply apparatus includes a tank section configured to store the glue; a supply port disposed near an end of the board base paper of the gypsum board and configured to supply the glue; and a pump section disposed on a glue supply path between the tank section and the supply port. The pump section is a positive displacement pump.

11 Claims, 8 Drawing Sheets

(51) Int. Cl.
*B05C 11/10* (2006.01)
*B28B 19/00* (2006.01)

(58) Field of Classification Search
CPC . B28B 17/0072; B28B 17/00; B28B 17/0081; B28B 1/30; B28B 17/0063; C04B 28/14; C04B 2111/0062
See application file for complete search history.

(56) References Cited

U.S. PATENT DOCUMENTS

| | | | |
|---|---|---|---|
| 3,578,517 A | 5/1971 | Lapp et al. | |
| 2016/0123895 A1 | 5/2016 | Yamazaki | |
| 2017/0246762 A1* | 8/2017 | Naydenov | B28B 19/0092 |
| 2017/0284844 A1* | 10/2017 | Fort | G01F 3/10 |
| 2018/0345534 A1 | 12/2018 | Bland et al. | |

FOREIGN PATENT DOCUMENTS

| | | |
|---|---|---|
| JP | S50-034023 | 4/1975 |
| JP | H05-148001 | 6/1993 |
| JP | H07-189458 | 7/1995 |
| JP | H10-305549 | 11/1998 |
| JP | 2003-053250 | 2/2003 |
| JP | 2016-142132 | 8/2016 |
| JP | 6817478 | 1/2021 |
| JP | 6817482 | 1/2021 |
| WO | 2020/125914 | 6/2020 |

OTHER PUBLICATIONS

Written Opinion of the International Searching Authority for PCT/JP2022/002253 mailed on Mar. 8, 2022.

Extended European Search Report mailed on Jun. 14, 2024 with respect to the corresponding European patent application No. 22745758.7.

Office Action mailed on Feb. 24, 2026 with respect to the corresponding Japanese patent application No. 2024-209429.

* cited by examiner

GLUE SUPPLY APPARATUS FOR GYPSUM BOARD, GYPSUM BOARD MANUFACTURING APPARATUS, AND GYPSUM BOARD MANUFACTURING METHOD

TECHNICAL FIELD

The present invention relates to a glue supply apparatus for a gypsum board, a gypsum board manufacturing apparatus, and a gypsum board manufacturing method.

BACKGROUND ART

Patent Document 1 discloses a gypsum board having a configuration in which a gypsum core is disposed between a lower surface sheet and an upper surface sheet.

RELATED-ART DOCUMENTS

Patent Documents

Patent Document 1: Japanese Laid-open Patent Publication No. 5-148001

SUMMARY OF THE INVENTION

Problem to be Solved by the Invention

A gypsum board is manufactured by supplying a gypsum slurry between two board base papers, which are also called surface sheets or the like, molding the gypsum slurry, and the like.

When a gypsum board is manufactured, glue is applied to overlapping portions of two board base papers such that the two board base papers are bonded to each other. The bonded two board base papers function to support a gypsum slurry in order to maintain the shape in the vicinity of the ends of the gypsum board until the supplied gypsum slurry is sufficiently hardened after the gypsum slurry is molded.

Conventionally, the supply rate at which glue is supplied and applied to a board base paper is controlled by manually adjusting, for example, the degree of opening or the like of valves on the glue supply line. Therefore, the degree of opening of the valves on the glue supply line may vary depending on the operator, thereby causing the supply amount of the glue to vary. In addition, if the supply amount of the glue is small, adjusting the degree of opening of the valves is difficult.

If the amount of the glue supplied to the board base paper is insufficient, there may be problems such as a decrease in the adhesion between two board base papers. If the adhesion between the two board base papers is insufficient, the gypsum slurry may be unable to be sufficiently supported by the two board base papers until the gypsum slurry is hardened after being molded. As a result, the shape of the ends of an obtained gypsum board may be unable to meet the standards, thereby resulting in a defective product.

Further, if the amount of the glue supplied to the board base paper is too large, the amount of the glue to be consumed increases, and thus, manufacturing costs of the gypsum board increase. In addition, if the amount of the glue supplied to the board base paper is too large, some glue may protrude from the board base paper, and the protruded glue may adhere to a molding machine or the like and may be solidified together with paper powder. If such a solidified material adhering to the molding machine or the like contacts the surface of the gypsum board, which is being manufactured, dents may be formed in the gypsum board, thereby resulting in a defective product.

In view of the above-described problems in the conventional technique, one aspect of the present invention is to provide a glue supply apparatus for a gypsum board, in which an appropriate amount of glue can be stably supplied to a board base paper.

Means to Solve the Problem

In order to solve the above problems, according to an embodiment of the present invention, a glue supply apparatus for a gypsum board is provided. The glue supply apparatus supplies glue to a board base paper of the gypsum board. The glue supply apparatus includes a tank section configured to store the glue; a supply port disposed near an end of the board base paper of the gypsum board and configured to supply the glue; and a pump section disposed on a glue supply path between the tank section and the supply port. The pump section is a positive displacement pump.

Effects of the Invention

According to an embodiment of the present invention, a glue supply apparatus for a gypsum board, in which an appropriate amount of glue can be stably supplied to a board base paper, can be provided.

MODE FOR CARRYING OUT THE INVENTION

In the following, embodiments of the present invention will be described with reference to the drawings. However, the present invention is not limited to the following embodiments, and various modifications and substitutions can be added to the following embodiments without departing from the scope of the present invention.

[Glue Supply Apparatus for Gypsum Board]

(1) Bonded Portion of Board Base Papers of Gypsum Board

Before describing a glue supply apparatus for a gypsum board, a bonded portion of board base papers will be described with reference to each of FIGS. 1A through 1C.

Figure 1A:
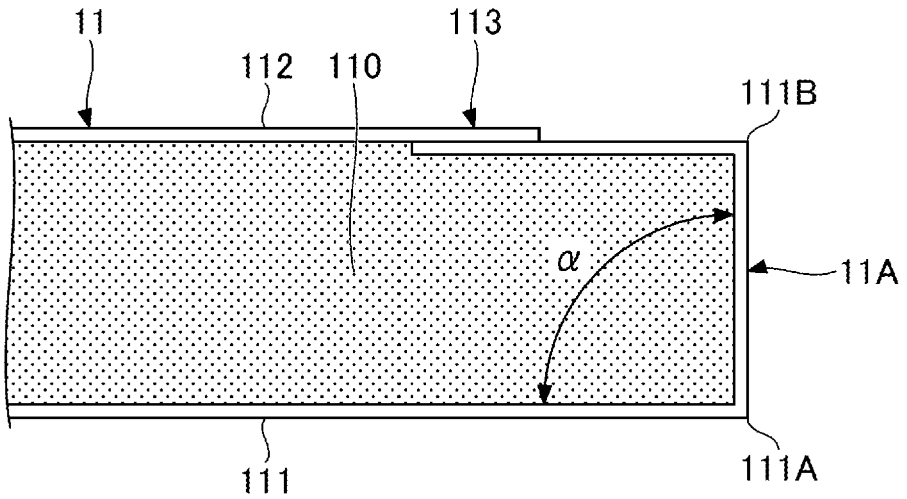
FIG. 1A is a drawing illustrating a bonded portion of board base papers.
Figure 1B:
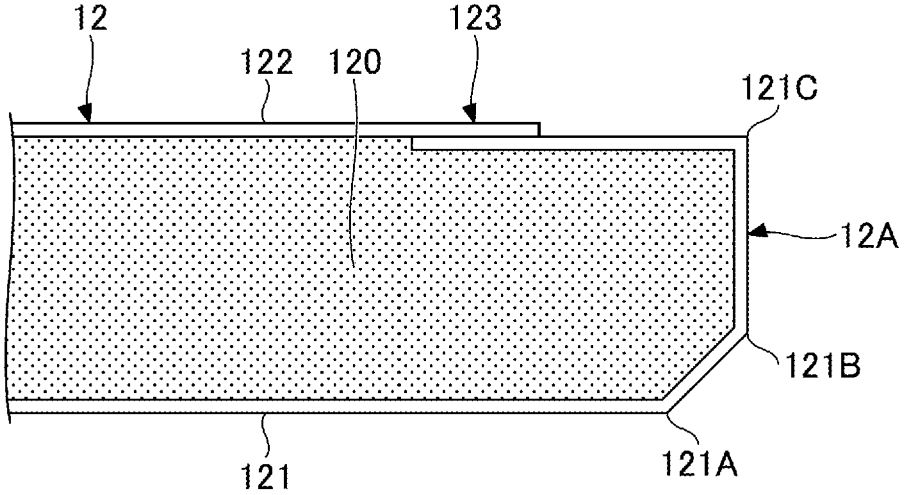
FIG. 1B is a drawing illustrating a bonded portion of board base papers.
Figure 1C:
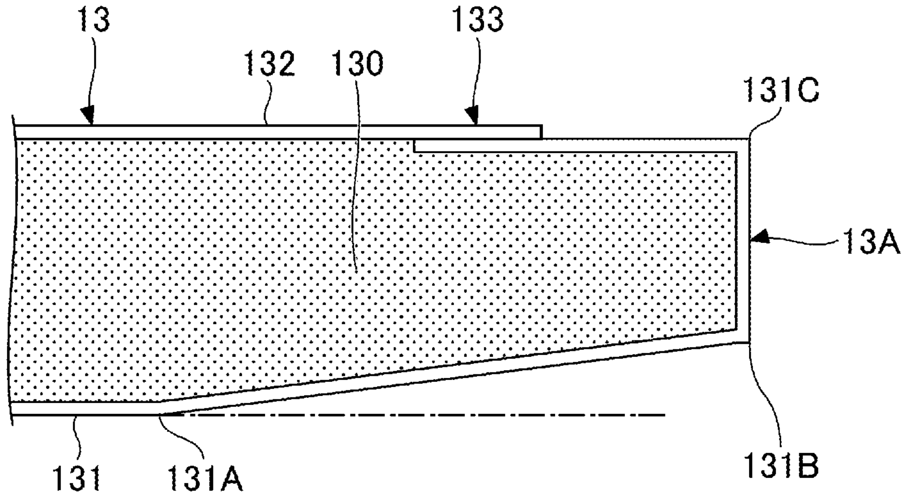
FIG. 1C is a drawing illustrating a bonded portion of board base papers.

FIGS. 1A through 1C are drawings each schematically illustrating a cross-section in the vicinity of the ends of a gypsum board in the width direction.

A gypsum board 11 illustrated in FIG. 1A Includes a gypsum core 110 formed from a hardened body of a gypsum slurry, a first board base paper 111, and a second board base paper 112. The gypsum board 11 has a configuration in which the gypsum core 110 is covered by the first board base paper 111 and the second board base paper 112.

The gypsum board 11 has an end 11A in the form of a square edge, and an edge angle α is set to be an approximately right angle. The first board base paper 111 is folded at corners 111A and 111B so as to form the end 11A of the gypsum board 11. Glue is applied or coated to an end region of the surface of the second board base paper 112 facing the first board base paper 111, and the end region of the surface of the second board base paper 112 is stacked on the upper end surface of the first board base paper 111, thereby forming a bonded portion 113.

A gypsum board 12 illustrated in FIG. 1B Includes a gypsum core 120 formed from a hardened body of a gypsum slurry, a first board base paper 121, and a second board base paper 122. The gypsum board 12 has a configuration in which the gypsum core 120 is covered by the first board base paper 121 and the second board base paper 122.

The gypsum board 12 has an end 12A in the form of a beveled edge. The first board base paper 121 is folded at corners 121A, 121B, and 121C so as to form the end 12A of the gypsum board 12. Glue is applied or bonded to an end region of the surface of the second board base paper 122 facing the first board base paper 121, and the end region of the surface of the second board base paper 122 is stacked on the upper end surface of the first board base paper 121, thereby forming a bonded portion 123.

A gypsum board 13 illustrated in FIG. 1C Includes a gypsum core 130 formed from a hardened body of a gypsum slurry, a first board base paper 131, and a second board base paper 132. The gypsum board 13 has a configuration in which the gypsum core 130 is covered by the first board base paper 131 and the second board base paper 132.

The gypsum board 13 has an end 13A in the form of a tapered edge. The first board base paper 131 is folded at corners 131A, 131B, and 131C so as to form the end 13A of the gypsum board 13. Glue is applied or coated to an end region of the surface of the second board base paper 132 facing the first board base paper 131, and the end region of the surface of the second board base paper 132 is stacked on the upper end surface of the first board base paper 131, thereby forming a bonded portion 133.

A glue supply apparatus for a gypsum board according to the present embodiment is an apparatus configured to supply glue to end regions of the surface of a second board base paper facing a first board base paper-124 so as to form bonded portions of the first board base paper and second board base paper. For example, as will be described later with respect to a gypsum board manufacturing apparatus, the glue supply apparatus for a gypsum board can be placed on the gypsum board manufacturing line and used when the gypsum board is manufactured.

(2) Glue Supply Apparatus for Gypsum Board

An example configuration of the glue supply apparatus for a gypsum board will be described.

The glue supply apparatus for a gypsum board (hereinafter also referred to as the "glue supply apparatus") is a glue supply apparatus configured to supply glue to a board base paper of a gypsum board, and includes a tank section, a supply port, and a pump section, which will be described later.

The tank section is a member configured to store glue.

The supply port is disposed near the end of a board base paper of a gypsum board, and can supply the glue.

The pump section is disposed on a glue supply path between the tank section and the supply port. The pump section can be a positive displacement pump.

An example configuration of the glue supply apparatus according to the present embodiment will be described with reference to FIGS. 2 through 4D.

Figure 2:
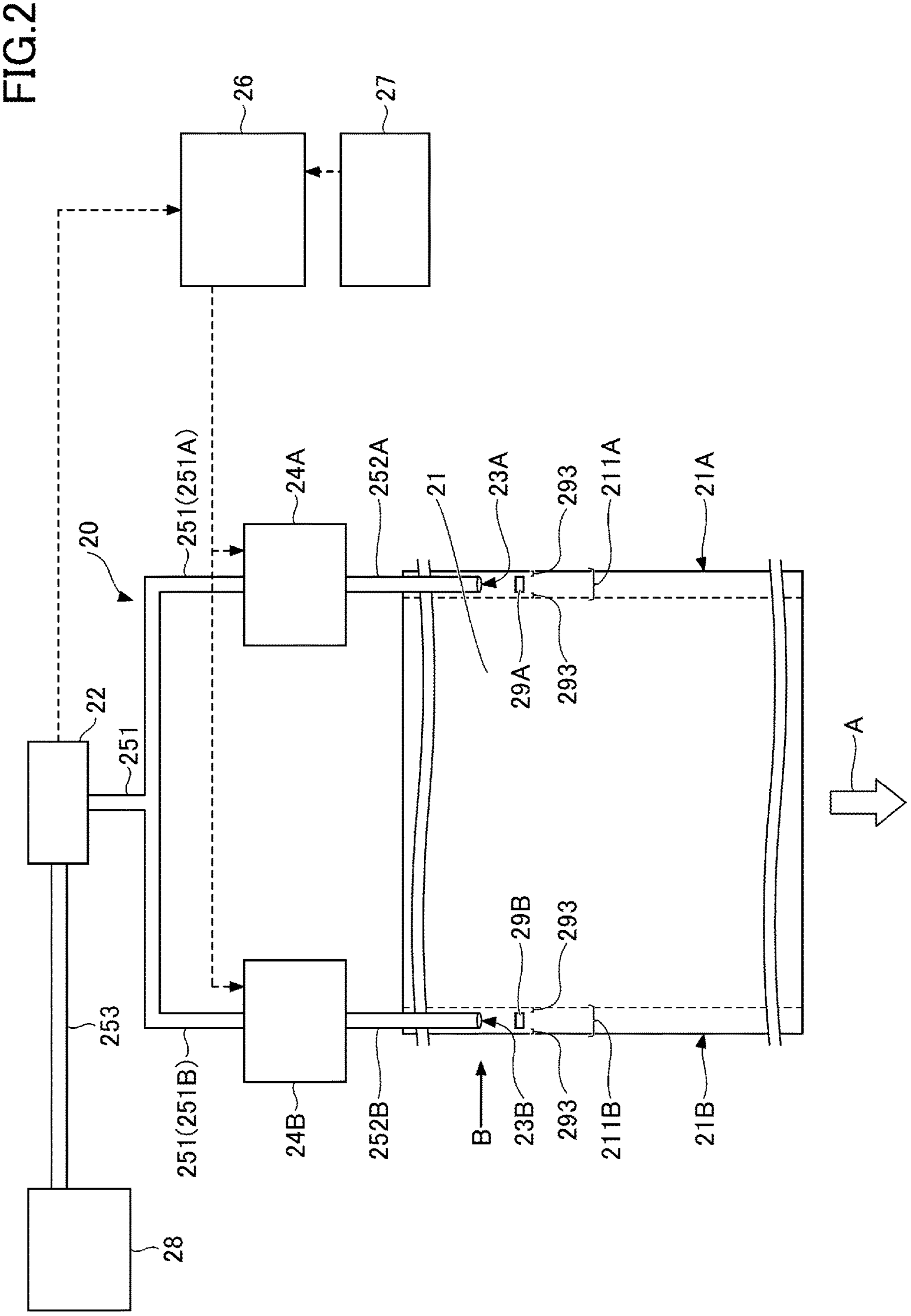
FIG. 2 is a drawing schematically illustrating a glue supply apparatus for a gypsum board according to an embodiment of the present invention.

FIG. 2 is a drawing schematically illustrating a glue supply apparatus 20 according to the present embodiment. The glue supply apparatus 20 supplies glue to end regions 211A and 211B along ends 21A and 21B of a board base paper 21 in the width direction, which is conveyed in a direction indicated by an arrow A.

Figure 3:
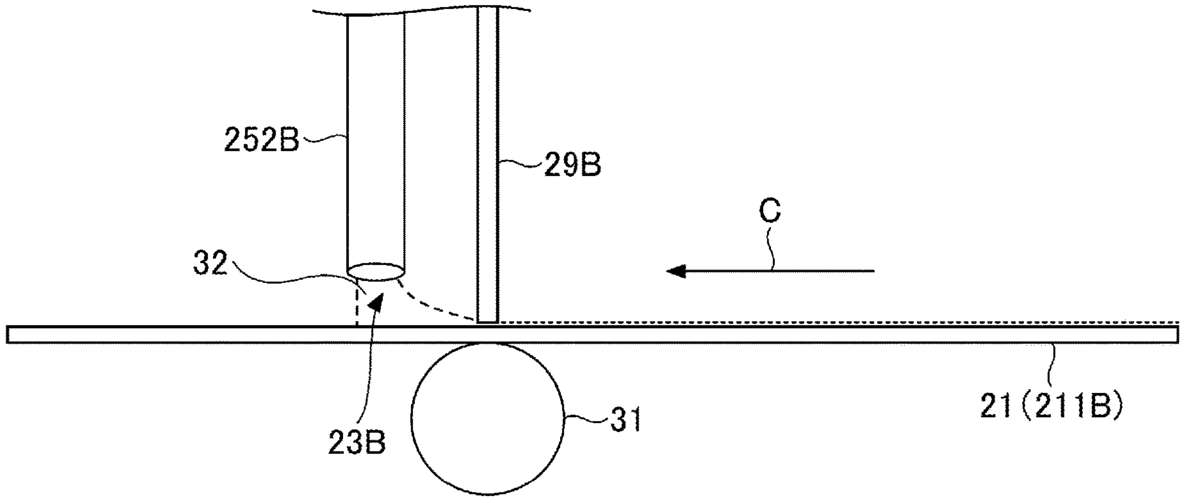
FIG. 3 is a side view of the vicinity of a supply port of the glue supply apparatus for a gypsum board of FIG. 2.

FIG. 3 is a side view of the vicinity of a supply port 23B of the glue supply apparatus 20 of FIG. 2 when viewed in a direction indicated by an arrow B.

FIGS. 4A through 4D are drawings illustrating a configuration in which a spreading member is a spatula.

As illustrated in FIG. 2, when a gypsum board is manufactured, the glue is typically applied to the end regions 211A and 211B along the both ends of the board base paper 21. Therefore, as illustrated in FIG. 2, it is preferable for the glue supply apparatus 20 to include two supply ports 23A and 23B, which supply the glue, according to the number of the end regions 211A and 211B to which the glue is applied. It is also preferable to include two pump sections according to the number of the supply ports 23A and 23B. However, the configuration of the glue supply apparatus according to the present embodiment is not limited thereto, and the glue supply apparatus may include one supply port and one pump section. In this case, a plurality of glue supply apparatuses may be used according to the number of end regions and the like to which the glue is applied.

In the following, members included in the glue supply apparatus according to the present embodiment will be described by using the glue supply apparatus 20 illustrated in FIG. 2 as an example.

(2-1) Tank Section

A tank section 22 is a tank configured to store glue to be supplied to the board base paper 21. The shape and the like of the tank section 22 are not particularly limited as long as the glue can be stored. The number of tank sections included in the glue supply apparatus 20 is not particularly limited, and the glue supply apparatus 20 may Include one tank section or a plurality of tank sections.

Even when the glue supply apparatus 20 according to the present embodiment includes a plurality of supply ports and a plurality of pump sections as described above, the glue supply apparatus 20 may include the one tank section 22 and a pipe for supplying the glue from the tank section 22 to the supply ports may branch into pipes as illustrated in FIG. 2, for example. In addition, the glue supply apparatus 20 according to the present embodiment can include a plurality of, for example, two tank sections 22 according to the number of supply ports and pump sections.

The tank section 22 may be a temporary buffer tank, that is, a tank that functions as an auxiliary tank. If the tank section 22 is a buffer tank, one or more main tank sections 28 can be provided on the upstream side of a glue supply path relative to the tank section 22, and the one or more main tank sections 28 and the tank section 22 can be connected by a third pipe 253. Note that a pump for conveying the glue from the one or more main tank sections 28 to the tank section 22 can also be provided on the third pipe 253 serving as the glue supply path, as necessary. The type of the pump is not particularly limited as long as the glue can be conveyed to the tank section 22. If a plurality of main tank sections 28 are provided, a valve for switching the main tank sections 28 to be connected to the tank section 22 can be provided between the main tank sections 28 and the tank section 22.

The main tank sections 28 are not necessarily provided, and only the tank section 22 can be provided as a tank configured to store the glue.

(2-2) Supply Port

Supply ports are disposed near the ends of the board base paper of the gypsum board, and can supply the glue. The number of supply ports of the glue supply apparatus according to the present embodiment is not limited, and the glue supply apparatus may include one supply port or may include a plurality of supply ports. For example, as illustrated in FIG. 2, two supply ports can be provided according to the number of the end regions to which the glue is applied.

As illustrated in FIG. 2, if the glue supply apparatus 20 according to the present embodiment includes two supply ports, that is, the supply ports 23A and 23B, the supply ports 23A and 23B can be disposed near the respective ends, that is, the ends 21A and 21B of the board base paper 21 of the gypsum board. The supply ports 23A and 23B can supply the glue to the end regions 211A and 211B.

The supply ports 23A and 23B can be constituted by, for example, end portions of second pipes 252A and 252B opposite the other end portions to which the pump sections 24A and 24B are connected.

For example, as illustrated in FIG. 3, the supply ports 23A and 23B can be disposed to face the end regions 211A and 211B of the board base paper 21. The end regions 211A and 211B refer to regions located within a predetermined distance from the ends 21A and 21B of the board base paper 21 in the width direction, respectively.

Note that the size of each of the end regions 211A and 211B is selected according to the width or the like of an overlapping portion where the board base paper 21 is bonded to the other board base paper, and thus, is not particularly limited. Further, the shape of each of the supply ports 23A and 23B is not particularly limited, and may be a circular shape as illustrated in FIG. 3 and the like. Alternatively, the shape of each of the supply ports 23A and 23B may be an elliptical shape, a polygonal shape, or the like in accordance with the shape of each of the end regions 211A and 211B.

The pump sections 24A and 24B and the supply ports 23A and 23B can be connected by the second pipes 252A and 252B, respectively. Note that the supply ports 23A and 23B may be constituted by portions of the second pipes 252A and 252B as described above.

At least the inner peripheral surfaces of the second pipes 252A and 252B are preferably made of silicone resin. More preferably, the second Pipes 252A and 252B are hoses made of silicone resin.

If the glue supply apparatus is used for a long period of time, glue may be solidified and may develop into a lump, and as a result, glue residues may be generated. If such residues remain in a pipe, the supply of glue would be blocked or the residues would be discharged onto the board base paper, thereby resulting in a defective product. Conversely, in the present embodiment, the inner peripheral surfaces of the second pipes 252A and 252B are made of silicone resin. Therefore, even if glue is partially solidified, the solidified glue can be discharged before developing into a large lump. Accordingly, it is possible to prevent the supply of glue from being blocked or prevent residues from being discharged onto the board base paper.

For the above reasons, it is preferable for the inner peripheral surfaces of pipes such as a first pipe 251 and the third pipe 253 that contact glue and connect members to be made of silicone resin. More preferably, the pipes are hoses made of silicone resin.

(2-3) Pump Section

The pump sections 24A and 24B can be disposed on glue supply paths between the tank section 22 and the supply ports 23A and 23B. The pump sections 24A and 24B can be provided for the supply ports 23A and 23B, respectively. As illustrated in FIG. 2, if the two pump sections 24A and 24B and the two supply ports 23A and 23B are provided, the pump sections 24A and 24B can be arranged in parallel on the glue supply paths between the tank section 22 and the supply ports 23A and 23B.

In the case of the glue supply apparatus 20 illustrated in FIG. 2, the glue supply paths between the tank section 22 and the supply ports 23A and 23B are constituted by the first pipe 251 and the second pipes 252A and 252B.

Positive displacement pumps can be used as the pump sections 24A and 24B.

The positive displacement pumps are pumps that change the volume of a fluid substance such as glue in a fixed space volume by reciprocating motion or rotary motion, give energy to the fluid substance, and convey the fluid substance.

The positive displacement pumps can supply a fixed amount of a fluid substance such as glue at a constant rate. The positive displacement pumps can be broadly classified into rotary positive displacement pumps and reciprocating positive displacement pumps, and can accurately control the supply amount by controlling the conditions of rotary motion or reciprocating motion.

Therefore, an appropriate amount of glue can be stably supplied to the board base paper by supplying the glue from the tank section 22 to the supply ports 23A and 23B by the pump sections, which are the positive displacement pumps. As a result, board base papers can be stably bonded to each other, and the ends of a gypsum board can be formed Into a desired shape. Further, the shape of the ends of a gypsum board can be prevented from not meeting the standards when the gypsum board is manufactured, thereby avoiding a defective product. Further, a situation in which glue leaking from the board base paper is solidified and adheres to a molding machine can be avoided. Further, formation of dents and the like on the surface of a gypsum board due to the solidified glue can be avoided. Accordingly, the yield of the gypsum board can be improved.

In the conventional technique, the supply amount of glue is controlled by adjusting the degree of opening of the valves. In this case, if the supply amount of the glue is small, it would be difficult to adjust the degree of opening of the valves so as to supply an appropriate amount while stabilizing the supply amount of the glue. In addition, in the conventional technique, a lump of solidified glue as described above may be caught in a valve, and as a result, the flow rate is not often stabilized. However, according to the positive displacement pumps, the supply amount can be accurately controlled even when the flow rate is low. Therefore, in the glue supply apparatus 20 according to the present embodiment, the supply amount can be stabilized even when the amount of glue supplied from the supply ports 23A and 23B is small. In addition, even if a lump of solidified glue is generated as described above, the supply amount of glue can be stabilized as compared to when the supply amount is controlled by adjusting the degree of opening of the valves as in the conventional technique.

The positive displacement pumps can be broadly classified into rotary positive displacement pumps (rotary pumps) and reciprocating positive displacement pumps (reciprocating pumps). The rotary positive displacement pumps among the positive displacement pumps are pumps that suck and discharge a fluid substance by rotary motion of a rotating component. Examples of the rotary positive displacement pumps include a gear pump, a vane pump, and a screw pump. The reciprocating positive displacement pumps among the positive displacement pumps are pumps that suck and discharge a fluid substance by reciprocating motion of a component. Examples of the reciprocating positive displacement pumps include a piston pump, a plunger pump, and a diaphragm pump. The positive displacement pumps used as the pump sections 24A and 24B of the glue supply apparatus 20 according to the present embodiment may be the rotary positive displacement pumps or the reciprocating positive displacement pumps. Preferably the rotary positive displacement pumps are used. This is because, although the viscosity of glue may change depending on the temperature or the like, by using the rotary positive displacement pumps as the pump sections 24A and 24B, variations in the flow rate of the glue due to changes in the viscosity of the glue can be particularly suppressed. Further, there may be a case where glue may be solidified and may adhere to the inner surfaces of the pump sections 24A and 24B, and as a result, residues may be generated. However, when the rotary positive displacement pumps are used, generation of such residues can be suppressed and glue can be stably supplied.

In addition, the positive displacement pumps used as the pump sections 24A and 24B are more preferably screw pumps. A screw pump is a type of a pump that conveys an object by using a screw-type rotor.

In a screw pump, the screw-type rotor rotates in a stator such that a series of independent sealed spaces called cavities are created in gaps between the rotor and the stator. Then, by the rotator rotating in the stator, the cavities move towards the discharge side while generating a strong suction force such that glue can be conveyed.

According to such a screw pump, because a constant transport quantity can be achieved without pulsation, the supply amount of glue can be Particularly accurately controlled, and such a screw pump can be used more preferably as a positive displacement pump as described above.

Among screw pumps, a uniaxial screw pump can be particularly preferably used. As the uniaxial screw pump, for example, a uniaxial eccentric screw pump (a MONO pump (registered trademark), which may also be called a MOYNO pump) is known and can be preferably used.

The pump section 24A and the pump section 24B may be different types of pumps. However, the pump section 24A and the pump section 24B are preferably the same type of pumps since it is preferable for glue to be supplied to each of the end regions of the board base paper 21 at the same supply rate.

The pump sections 24A and 24B can be connected to the tank section 22 by first pipes 251A and 251B. In FIG. 2, the first pipe 251 branches into the first pipes 251A and 251B at its midsection. However, respective first pipes may be provided for the pump sections 24A and 24B, and may be configured to be directly connected to the tank section 22. Note that, as in the example illustrated in FIG. 2, arranging the pump section 24A and the pump section 24B in parallel means that the pump section 24A is arranged on a path constituted by the first pipe 251A and the second pipe 252A, and the pump section 24B is arranged on a path constituted by the first pipe 251B and the second pipe 252B.

The glue supply apparatus according to the present embodiment can further include any members.

(2-4) Controller

The glue supply apparatus 20 can further include a controller 26.

The controller 26 can control the operation of the pump sections 24A and 24B. More specifically, the controller 26 can control the supply rate at which glue is supplied from the tank section 22 to the supply ports 23A and 23B by the pump sections 24A and 24B. Note that the supply rate of the glue means the supply amount of the glue per time unit.

The controller 26 can control the supply rate of the glue in accordance with the conveyance speed of the board base paper 21 to which the glue is to be supplied. The conveyance speed of the board base paper 21 is selected in accordance with manufacturing conditions of a gypsum board that uses the board base paper 21, and it can be said that the conveyance speed is one of the manufacturing conditions of the gypsum board. Therefore, the controller 26 can control the supply rate at which the glue is supplied from the tank section 22 to the supply ports 23A and 23B by the pump sections 24A and 24B, in accordance with the manufacturing conditions of the gypsum board to be manufactured by a gypsum board manufacturing apparatus or the like in which the glue supply apparatus 20 is installed.

The controller 26 controls the supply rate at which the glue is supplied from the tank section 22 to the supply ports 23A and 23B by the pump sections 24A and 24B, in accordance with the manufacturing conditions of the gypsum board to be manufactured. Thus, the glue can be supplied to the board base paper under the optimum conditions in accordance with the manufacturing conditions of the gypsum board to be manufactured. In addition, in a case where the manufacturing conditions of the gypsum board to be manufactured are changed, the supply rate of the glue can be switched to the optimum rate in a short period of time, as compared to when the amount of glue supplied to the board base paper is controlled by manually adjusting the degree of opening of the valves.

Therefore, when the type or the like of the gypsum board to be manufactured is changed, the time required to switch the manufacturing conditions can be reduced. In addition, a situation in which products that do not meet the standards are produced while the manufacturing conditions are switched can be avoided.

The controller 26 can include a CPU, which is an arithmetic processing unit for performing calculations necessary to control, a RAM or a ROM, which is a main storage device, an auxiliary storage device, an input/output interface, and a display device, which is an output device. The CPU, the main storage device, the auxiliary storage device, the input/output interface, and the output device of the controller 26 can be connected to one another via a bus. All of the above-described devices of the controller 26 do not need to be housed in the same housing. For example, the auxiliary storage device and the display device may be provided outside the housing. The auxiliary storage device is a storage device such as an SSD or an HDD.

Note that the CPU stands for a central processing unit, the RAM stands for a random access memory, and the ROM stands for a read-only memory. Further, the SSD stands for a solid state drive and the HDD stands for a hard disk drive.

Examples of the input/output interface include wired and wireless interfaces for exchanging data such as control amounts and operation statuses between the pump sections 24A and 24B. The input/output interface may be configured to exchange data with the tank section 22 as necessary, so as to acquire data such as the remaining amount of glue and the temperature in the tank section 22. In this case, the controller 26 may also utilize such data from the tank section 22 when determining control conditions.

Examples of the input/output interface also include user interfaces such as a touch panel, a keyboard, and operation buttons for selecting control conditions.

The controller 26 can be comprised of a personal computer (PC) or the like. Therefore, in an information processing apparatus such as a personal computer, the above-described devices of the controller 26 may be implemented in cooperation with software and hardware by executing a program 13 stored in the CPU in advance.

In the example illustrated in FIG. 2, the pump sections 24A and 24B are controlled by the one controller 26; however, the configuration is not limited thereto, and respective controllers may be provided for the pump sections 24A and 24B. If a plurality of controllers are provided, the controllers may be configured to exchange control data with each other, as necessary.

If the pump sections 24A and 24B are the rotary positive displacement pumps among the positive displacement pumps, the controller 26 can control the rotational speed of the pumps. By using the rotary positive displacement pumps as the pump sections 24A and 24B and controlling the rotational speed of the pumps, the supply rate of glue supplied from the pump sections 24A and 24B to the board base paper 21 through the supply ports 23A and 23B can be easily controlled to a desired value.

(2-5) Storage

The glue supply apparatus 20 can include a storage 27.

The storage 27 can store glue supply conditions. Specifically, the storage 27 can store glue supply conditions corresponding to a plurality of manufacturing conditions of gypsum boards. In this case, the controller 26 can select and acquire glue supply conditions stored in the storage 27 and control the supply rate at which glue is supplied from the tank section 22 to the supply ports 23A and 23B by the pump sections 24A and 24B, in accordance with manufacturing conditions of a gypsum board to be manufactured.

Recipes of the glue supply conditions corresponding to the plurality of manufacturing conditions of the gypsum boards are created and stored in the storage 27 in advance. By controlling the supply rate of glue in accordance with such a recipe and manufacturing conditions of a gypsum board to be manufactured, an optimum amount of glue can be supplied to the board base paper. In addition, unlike the technique in which the supply amount of glue is controlled by manually adjusting the degree of opening of the valves, control conditions can be prevented from varying depending on the operator, and a gypsum board can be manufactured with particularly stable quality.

The storage 27 can be comprised of a storage device such as an SSD or an HDD. If the controller 26 is composed of a personal computer, the storage 27 can be comprised of an auxiliary storage device of the personal computer.

(2-6) Spreading Member

The glue supply apparatus 20 can further include spreading members 29A and 29B configured to spread glue on the board base paper 21. The spreading members refer to members that cause glue, supplied onto the board base paper 21, to spread on the board base paper 21.

As illustrated in FIG. 3, the spreading member 29B can spread glue 32, supplied from the supply port 23B to the end region 211B of the board base paper 21, over the entire predetermined range of the end region 211B while suppressing variations in thickness. In FIG. 3, only the configuration on the spreading member 29B side is depicted, but the spreading member 29A can be similarly configured.

Each of the spreading members 29A and 29B may be any member that can spread glue. For example, a spatula, a roller, a brush, or the like can be used. In particular, a spatula can be preferably used.

Figure 4A:
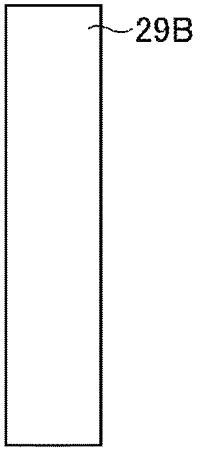
FIG. 4A is a drawing illustrating a spreading member.

If spatulas are used as the spreading members 29A and 29B, the spreading members 29A and 29B can both have a plate shape as with the case of the spreading member 29B illustrated in FIG. 4A, for example. Note that, in FIG. 4A, the spreading member 29B is viewed in a direction indicated by an arrow C of FIG. 3. The same applies to FIGS. 43 through 4D below. However, if the spreading members 29A and 29B both have a simple plate shape and the distance between the board base paper 21 and the spreading members 29A and 29B is small, the thickness of glue may decrease in regions of the board base paper 21 passing under the spreading members 29A and 29B, and may increase in adjacent regions 293 (see FIG. 2) that are adjacent to the regions passing under the spreading members 29A and 29B.

Figure 4B:
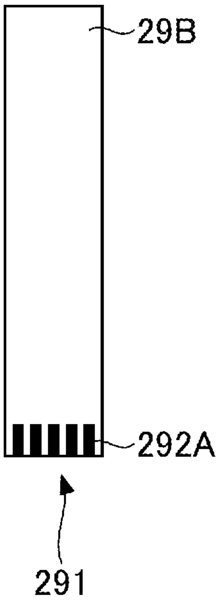
FIG. 4B is a drawing illustrating the spreading member.
Figure 4C:
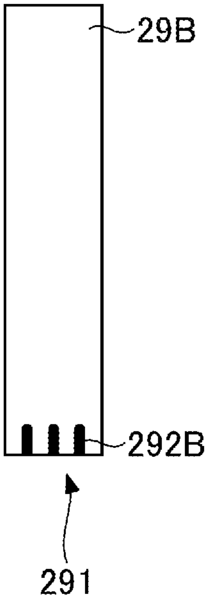
FIG. 4C is a drawing illustrating the spreading member.
Figure 4D:
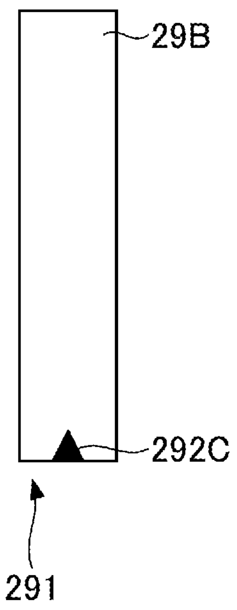
FIG. 4D is a drawing illustrating the spreading member.

Therefore, if spatulas are used as the spreading members 29A and 29B, each of the spatulas, which are the spreading members, preferably has a cut 292A in an end portion 291 facing the board base paper, as with the case of the spreading member 29B illustrated in FIG. 4B. By providing the cut 292A, the thickness of glue can be increased in a region under the cut 292A. Therefore, the thickness of glue can be prevented from decreasing in the entire regions passing under the spread members 29A and 29B. Thus, the thickness of glue can be prevented from greatly varying in the end regions 211A and 211B of the board base paper 21. The shapes, the sizes, and the number of cuts 292A are not particularly limited, and can be selected in accordance with the thickness of glue required for the end regions 211A and 211B, the type of glue used, and the like. For example, cuts may have one or more shapes selected from a polygonal shape, a semicircular shape, a semielliptical shape, and the like. As illustrated in FIG. 4B, the cut 292A may be a slit having a rectangular shape. Further, the cut 292A may be a cut 292B having a semielliptical shape as illustrated in FIG. 4C, or may be a cut 292C having a triangular shape as illustrated in FIG. 4D. In addition, the shapes and the sizes of cuts provided in one spatula are not necessarily the same, and the cuts may have different shapes and sizes. In FIGS. 4A through 4D, the one spreading member 29B is depicted as an example, but the spreading member 29A can also be similarly configured. Note that the configurations, such as cuts, of the spreading member 29A and the spreading member 29B included in the glue supply apparatus 20 may be the same or may be different.

If the spreading members 29A and 29B are provided, support members such as rollers 31 are preferably provided on the opposite side of the board base paper 21 from the spreading members 29A and 29B, as illustrated in FIG. 3.

By providing the rollers 31, the loads of the spreading members 29A and 29B and the board base paper 21 can be supported. Note that the spreading 13 members 29A and 29B are supported by the rollers 31 through the board base paper 21.

Therefore, by providing the rollers 31, the force applied by the spreading members 29A and 29B can be prevented from escaping when glue is pressed against the board base paper 21 and is spread by the spreading members 29A and 29B. In addition, by providing the rollers 31, the board base paper 21 can be prevented from being damaged or the like when glue is pressed against the board base paper 21 and is spread by the spreading members 29A and 29B.

[Gypsum Board Manufacturing Apparatus]

Next, an example configuration of a gypsum board manufacturing apparatus according to the present embodiment will be described.

The gypsum board manufacturing apparatus according to the present embodiment can include the above-described glue supply apparatus for a gypsum board.

The gypsum board manufacturing apparatus according to the present embodiment can include various units necessary to manufacture a gypsum board, in addition to the above-described glue supply apparatus.

An example configuration of a gypsum board manufacturing apparatus 50 will be described with reference to FIG. 5. In addition to the above-described glue supply apparatus 20, the gypsum board manufacturing apparatus 50 includes a mixer 52 that is a mixing unit configured to mix raw materials, and a molding machine 58 configured to mold a gypsum slurry prepared by the mixer 52. The example configuration of the gypsum board manufacturing apparatus will be described in detail below.

(1) Mixer

The mixer 52 can be disposed at a predetermined position with respect to conveyance lines of a first board base paper 511, a second board base paper 512, and the like. For example, the mixer 52 can be disposed above or alongside a conveyance line. In the single mixer 52, a gypsum slurry can be prepared by kneading calcined gypsum, water, and, in some cases, various additives, which are raw materials of the gypsum slurry.

The calcined gypsum is also called calcium sulfate hemihydrate, and is an inorganic composition having a hydraulic property. As the calcined gypsum, β-calcined gypsum or α-calcined gypsum can be used alone, or a mixture of β-calcined gypsum and α-calcined gypsum can be used. The β-calcined gypsum is obtained by calcining one of or a mixture of natural gypsum, by-product gypsum, flue-gas gypsum, and recycled gypsum such as a waste gypsum board in the atmosphere. The α-calcined gypsum is obtained by calcining one of or a mixture of natural gypsum, by-product gypsum, flue-gas gypsum, and recycled gypsum such as a waste gypsum board in water (including in steam).

When a gypsum board is manufactured, the calcined gypsum used as a raw material preferably includes β-calcined gypsum, and more preferably, the main component of the calcined gypsum used as a raw material is β-calcined gypsum. As used herein, the "main component of the calcined gypsum used as a raw material of a gypsum board is β-calcined gypsum" means that the mass percentage of β-calcined gypsum in the calcined gypsum is greater than 50%. When manufacturing a gypsum building material, the calcined gypsum used as a raw material may be composed solely of β-calcined gypsum. When a gypsum board is manufactured, the calcined gypsum used as a raw material may be composed solely of β-calcined gypsum.

In order to manufacture α-calcined gypsum, it is necessary to pressure-calcine dihydrate gypsum such as natural gypsum in water or steam by using an autoclave. Conversely, β-calcined gypsum can be manufactured by calcining dihydrate gypsum such as natural gypsum under normal pressure in the atmosphere. Thus, β-calcined gypsum can be produced at higher productivity as compared to α-calcined gypsum.

As the additives, for example, one or more of the following may be used: adhesion improvers such as starch and polyvinyl alcohol for improving the adhesion between hardened gypsum body (a hardened gypsum slurry) and board base papers; inorganic fibers such as glass fibers; lightweight aggregate; refractory materials such as vermiculite; setting retarders; setting accelerators; water-reducing agents; foaming agents such as sodium alkyl sulfates, alkyl ether sulfates, sodium alkylbenzene sulfonates, and polyoxyethylene alkyl sulfates; foam size adjusting agents such as sulfosuccinate surfactants; water repellents such as silicone and Paraffin; organic carboxylic acid; and organic carboxylate.

Note that the calcined gypsum and some additives such as solid additives may be mixed and agitated in advance, and a resulting gypsum composition, which is a mixture, may be supplied to the mixer 52.

Further, foam may be added from one or more of gypsum slurry dispensing ports 521, 522, and 523, and a gypsum slurry with any density may be obtained by adjusting the amount of foam added. For example, a high-density first gypsum slurry 53 may be prepared by not adding foam or by adding a small amount of foam from each of the dispensing port 521 and 522. Further, a low-density second gypsum slurry 54 may be prepared by adding, from the dispensing port 523, an amount of foam greater than the amount of foam added to the first gypsum slurry 53.

Then, the obtained first gypsum slurry 53 is supplied through delivery pipes 551 and 552 to the first board base paper 511 and the second board base paper 512 at positions upstream of roller coaters 56 in the conveying direction of the board base paper.

The high-density first gypsum slurry 53, supplied to the first board base paper 511 and the second board base paper 512, reaches spreading sections of the roller coaters 56 and is spread at the spreading sections. Each of the roller coaters 56 can include a coating roller 561, a receiving roller 562, and a residue removal roller 563. When the first board base paper 511 or the second board base paper 512 passes between the coating roller 561 and the receiving roller 562, the first gypsum slurry 53 can be spread on the first board base paper 511 or the second board base paper 512.

In this manner, a thin layer of the first gypsum slurry 53 is formed on the first board base paper 511. Then, the first board base paper 511 is folded such that its side edges extend upward and then extend inward. A thin layer of the first gypsum slurry 53 is also formed on the second board base paper 512. However, unlike the first board base paper 511, the second board base paper 512 is not folded. Note that the present invention is not limited to the configuration in which the first gypsum slurry 53 is applied to both of the first board base paper 511 and the second board base paper 512. For example, the first gypsum slurry 53 may be applied to either the first board base paper 511 or the second board base paper 512. Further, the first gypsum slurry 53 may be disposed only on the side ends, which are the ends of the first board base paper 511 in the width direction.

The first board base paper 511 is conveyed in the same conveying direction. The conveying direction of the second board base paper 512 is changed by a turning roller 57 toward the conveying line of the first board base paper 511.

(2) Glue Supply Apparatus

The above-described glue supply apparatus 20 can supply and apply glue to the end regions of the second board base paper 512.

As the above glue, a liquid adhesive can be preferably used. A starch-type adhesive, a natural rubber latex adhesive, or a synthetic adhesive is more preferable, and an aqueous emulsion-type adhesive is even more preferable. As used herein, the "liquid adhesive" refers to an adhesive that is a liquid at use temperature, for example, at room temperature (27° C.).

A position where the glue supply apparatus 20 is installed is not particularly limited; however, for example, the glue supply apparatus 20 can be installed before a position where the gypsum slurry is supplied to the second board base paper 512.

The glue supply apparatus 20 has already been described, and thus, the description thereof will be omitted. If the glue supply apparatus includes the spreading members 29A and 29B, as illustrated in FIG. 5, the above-described rollers 31 are preferably disposed to support the loads and the like of the spreading members 29A and 29B and the board base paper 21.

(3) Molding Machine

The first board base paper 511 and the second board base paper 512 being conveyed in the gypsum board manufacturing apparatus 50 reach the molding machine 58. The second gypsum slurry 54 is supplied between the thin layers of the first gypsum slurry 53 formed on the first board base paper 511 and the second board base paper 512 from the mixer 52 via a pipe line 553. As a result, a continuous stacked body having a layer formed by the first gypsum slurry 53, a layer formed by the second gypsum slurry 54, and a layer formed by the first gypsum slurry 53 can be formed between the first board base paper 511 and the second board base paper 512.

Note that the present invention is not limited to the configuration in which the high-density first gypsum slurry and the low-density second gypsum slurry are used. For example, a gypsum slurry with one specific density may be manufactured and supplied onto the board base paper.

Specifically, for example, a gypsum slurry with a predetermined density is supplied onto the first board base paper 511, which is continuously conveyed, so as to deposit a layer of the gypsum slurry on the first board base paper 511. Then, the ends of the first board base paper 511 in the width direction are folded along predetermined carved lines so as to extend upward and then extend inward. As a result, the deposited layer of the gypsum slurry is partially wrapped by the first board base paper 511. Then, the second board base paper 512, which is conveyed at the same speed, is stacked on the deposited layer of the gypsum slurry partially wrapped by the first board base paper 511. The stacked body then passes through the molding machine for determining the thickness and the width of a gypsum board. In this manner, a gypsum board can also be formed. In this case, the layer of the gypsum slurry with the predetermined density is formed between the first board base paper and the second board base paper.

As described, the molding machine 58 of the gypsum board manufacturing apparatus 50 can perform a molding process for molding a gypsum slurry, and can thereby manufacture a gypsum slurry molded body 59.

The gypsum board manufacturing apparatus according to the present embodiment can further include any members as necessary.

(4) Dryer and Cutter

In the gypsum board manufacturing apparatus according to the present embodiment, a dryer, a cutter, and the like may be provided downstream of the molding machine 58.

The dryer can reduce excess water contained in the gypsum slurry molded body.

One or more cutters may be provided as necessary. For example, a first cutter (rough cutting cutter) that roughly cuts a manufactured gypsum board in order to place the gypsum board in the dryer can be provided. Further, a second cutter that cuts the gypsum board according to the size of an end product can be provided.

(5) Inspection Device

The gypsum board manufacturing apparatus according to the present embodiment can include various inspection devices For example, the gypsum board manufacturing apparatus according to the present embodiment can include a gluing failure inspection device 60 that inspects whether there is a gluing failure in a bonded portion as described above.

A bonded portion of the first board base paper and the second board base paper has the property of protruding if a gluing failure occurs in the bonded portion. The gluing failure inspection device 60 utilizes this property.

Figure 6:
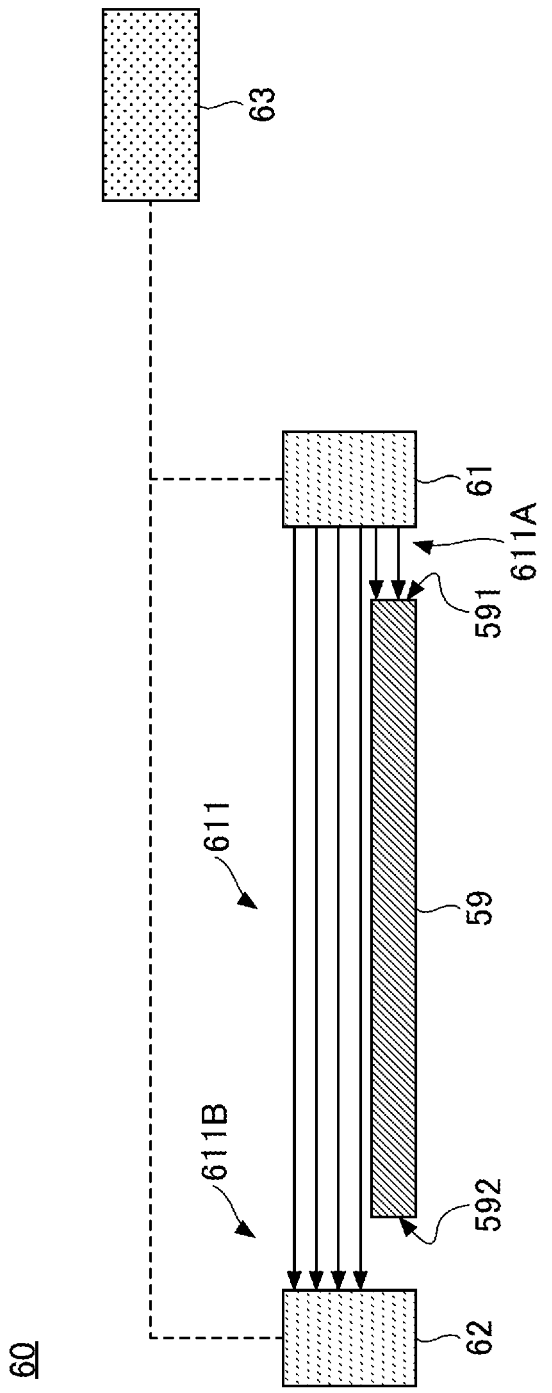
FIG. 6 is a drawing illustrating a gluing failure inspection device.

Specifically, as illustrated in FIG. 6, the gluing failure inspection device 60 includes a light emitting unit 61 that emits laser light 611 along the width direction of the gypsum slurry molded body 59; a light receiving unit 62 that receives light from the above light emitting unit 61; and a determining unit 63. The light emitting unit 61 is disposed to face a first end 591 that is one end of the gypsum slurry molded body 59 in the width direction. The light receiving unit 62 is disposed to face a second end 592 that is the other end opposite to the first end 591 of the gypsum slurry molded body 59 in the width direction.

Of the laser light 611 emitted from the light emitting unit 61, some light 611A is blocked by the gypsum slurry molded body 59 and does not reach the light receiving unit 62. The remaining light 611B of the laser light 611 emitted from the light emitting unit 61 reaches the light receiving unit 62 and is detected.

Then, the determining unit 63 can determine whether there is a gluing failure based on the height of a region where light, of the laser light 611 emitted from the light emitting unit 61, is blocked by the gypsum slurry molded body 59 and is not received by the light receiving unit 62.

If the determining unit 63 detects a gluing failure, a mark or the like is attached to a portion where the gluing failure is detected such that the failure can be identified. Then, after a gypsum board is cut by, for example, a cutter, a product including the portion can be eliminated as a defective product.

Further, the controller 26 (see FIG. 2) can be configured to output a command to increase the glue supply rate if a gluing failure is detected.

Note that the inspection device is not limited to the above-described gluing failure inspection device. The gypsum board manufacturing apparatus 50 can include inspection devices such as a size/weight inspection device that inspects whether the size, weight, and the like of a manufactured gypsum board meet the standards.

The gypsum board manufacturing apparatus according to the present embodiment uses the above-described glue supply apparatus. Thus, an appropriate amount of glue can be stably supplied to the second board base paper. Accordingly, a gluing failure in a bonded portion of the first board base paper and the second board base paper can be avoided. As a result, the ends of a gypsum board in the width direction can both have a predetermined shape, and a defective product that does not meet the standards can be avoided.

[Gypsum Board Manufacturing Method]

A gypsum board manufacturing method according to the present embodiment can include a glue supply process of supplying glue to a board base paper by the above-described glue supply apparatus for a gypsum board.

The gypsum board manufacturing method according to the present embodiment can include the following processes, for example.

A gypsum slurry preparation process of preparing a gypsum slurry by kneading calcined gypsum, water, and in some cases, various additives, which are raw materials of the gypsum slurry.

A glue supply process of supplying glue to a board base paper by the glue supply apparatus for a gypsum board.

A molding process of supplying the gypsum slurry between two board base papers, and molding the gypsum slurry into a plate shape.

A hardening process of hardening the plate-shaped molded body obtained in the molding process.

Each of the processes will be described below.

(Gypsum Slurry Preparation Process)

In the gypsum slurry preparation process, a gypsum slurry can be prepared by kneading calcined gypsum, water, and in some cases, various additives and foam.

For example, as described with respect to the gypsum board manufacturing apparatus, the raw materials can be kneaded by the mixer or the like to prepare a gypsum slurry. The raw materials of the gypsum slurry have already been described above, and the description thereof will be omitted.

(Glue Supply Process)

In the glue supply process, the glue supply apparatus can supply and apply glue to a board base paper, specifically, to the end regions of the second board base paper. The glue supply apparatus and the like have already been described above, and the description thereof will be omitted.

(Molding Process)

In the molding process, the gypsum slurry obtained in the gypsum slurry preparation process is supplied between two board base papers, and is molded into a plate shape.

For example, as described with respect to the gypsum board manufacturing apparatus, in the gypsum slurry molding process, the high-density first gypsum slurry 53 and the low-density second gypsum slurry 54 are formed in advance. Then, in the molding process, a continuous stacked body having a layer of the first gypsum slurry 53, a layer of the second gypsum slurry 54, and a layer of the first gypsum slurry 53 can be formed between the first board base paper 511 and the second board base paper 512. Then, the stacked body passes through the molding machine 58 for determining the thickness of a gypsum board, and is molded into a plate shape. As a result, a gypsum slurry molded body can be formed.

However, the present invention is not limited to the above configuration. In the molding process, a gypsum slurry with a desired density can be supplied between the board base papers and can be molded into a plate shape by the molding machine.

(Hardening Process)

The hardening process can be performed after the molding process. The hardening process is a process of hardening the gypsum slurry molded body obtained in the molding process.

In the hardening process, acicular crystals of dihydrate gypsum are formed by a hydration reaction, and as a result, calcined gypsum (hemihydrate gypsum) in the gypsum slurry sets and solidifies. Accordingly, in the hardening process, the calcined gypsum and water added to the gypsum slurry react with each other in the molded body formed in the molding process, and the hydration reaction of the calcined gypsum proceeds.

The gypsum board manufacturing method can further include any processes. Specifically, the gypsum board manufacturing method can include the following processes, for example.

A first cutting process of cutting the gypsum slurry molded body.

A drying process of drying the cut gypsum slurry molded body.

A second cutting process of cutting a gypsum board.

An inspection process of inspecting whether there is a gluing failure in a bonded portion of the board base papers.

(First Cutting Process)

In the first cutting process, the gypsum slurry molded body can be cut. Note that, after the gypsum slurry molded body is formed in the molding process, the gypsum slurry gradually hardens. Therefore, the first cutting process can be performed, for example, while the hardening process is performed or after the hardening process is completed. The first cutting process is preferably performed after the hardening process proceeds to such an extent that the gypsum slurry molded body can be cut.

The first cutting process can also be referred to as a rough cutting process in which the gypsum slurry molded body is cut into a desired size according to, for example, the size of the dryer used in the drying process as will be described below.

(Drying Process)

In the drying process, excess water contained in the gypsum slurry molded body can be dried. Note that the drying process can be performed by supplying the gypsum slurry molded body that has been subjected to the hardening process. The drying process can be performed by using the dryer to forcibly dry the molded body.

A method of forcibly drying the molded body by the dryer is not particularly limited. For example, the dryer can be provided on a conveyance path of the molded body, and the molded body can pass through the dryer so as to be continuously dried. Alternatively, the molded body can be introduced into the dryer and the molded body can be dried for each batch.

(Second Cutting Process)

The second cutting process for cutting a gypsum board can be further included, for example.

The second cutting process can be performed, for example, after the drying process. In the second cutting process, the gypsum board can be cut into a desired product size.

(Inspection Process)

In the inspection process, whether or not there is a gluing failure in a bonded portion of the board base papers can be inspected.

Specifically, the above-described gluing failure inspection device can inspect whether there is a gluing failure in a bonded portion. If a gluing failure is detected, a mark or the like is attached to a portion where the gluing failure is detected such that the failure can be identified. Then, after the gypsum board is cut in the second cutting process, a product including the portion can be eliminated as a defective product.

Further, the controller 26 can be configured to output a command to increase the glue supply rate if a gluing failure is detected.

The inspection process is not limited to the inspection process of inspecting whether there is a gluing failure. In the inspection process, whether or not the size, weight, and the like of the manufactured gypsum board meet the standards can also be inspected.

The timing of the inspection process is not particularly limited, and can be selected based on the inspection details and the like.

According to the gypsum board manufacturing method of the present embodiment, the above-described glue supply apparatus is used in the glue supply process. Thus, an appropriate amount of glue can be stably supplied to the second board base paper. Accordingly, a gluing failure in a bonded portion of the first board base paper and the second board base paper can be avoided. As a result, the ends of a gypsum board in the width direction can be formed into a predetermined shape, thereby avoiding a defective product that does not meet the standards.

EXAMPLES

Although Examples will be described in detail below, the present invention is not limited to these Examples.

Example 1

Figure 5:
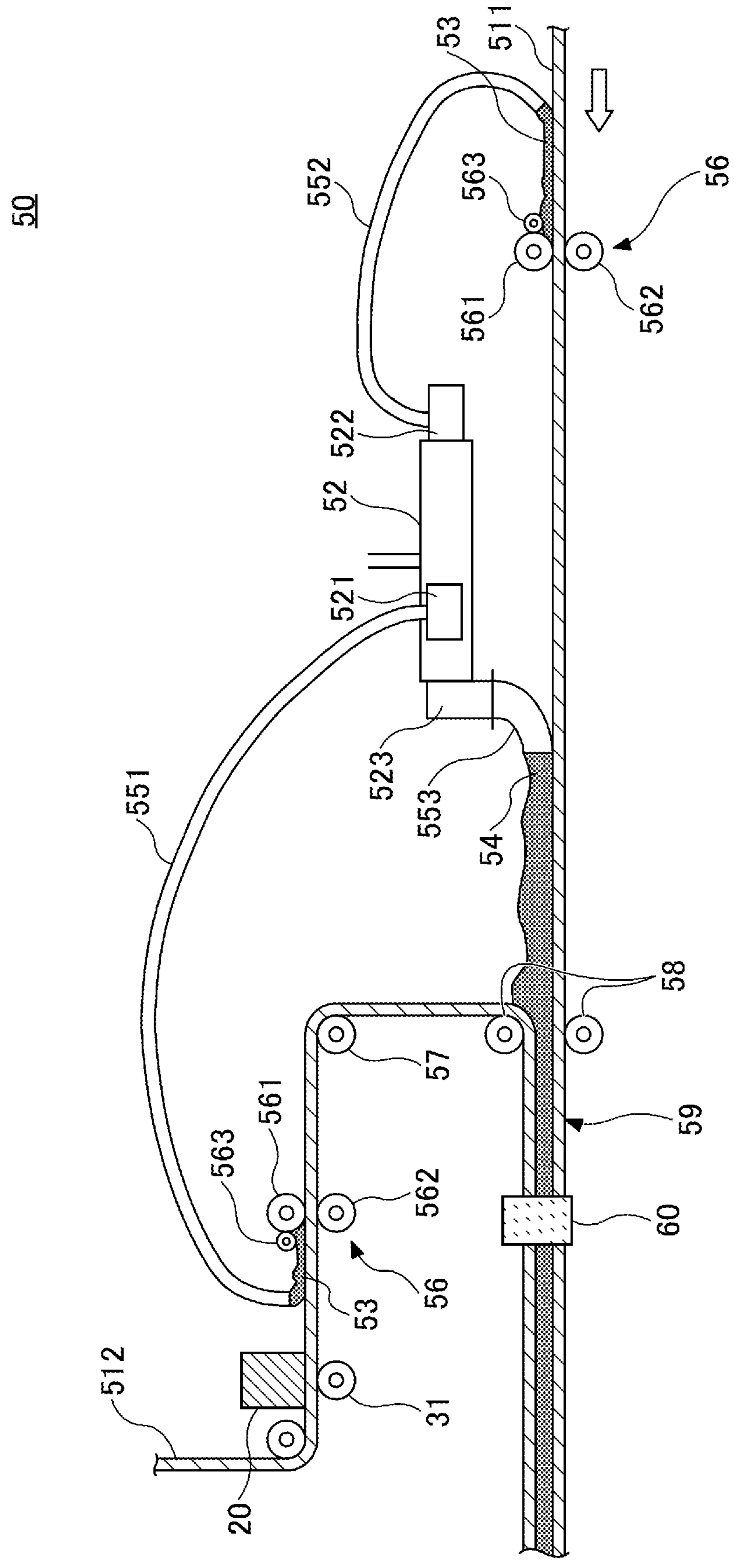
FIG. 5 is a drawing illustrating a gypsum board manufacturing apparatus according to the embodiment of the present invention.

A gypsum board was manufactured by using the gypsum board manufacturing apparatus 50 illustrated in FIG. 5.

As illustrated in FIG. 5, the gypsum board manufacturing apparatus 50 includes the mixer 52, which is the mixing unit configured to mix raw materials, and the molding machine 58 configured to mold a gypsum slurry prepared by the mixer 52. The glue supply apparatus 20 is disposed on a conveyance path of the second board base paper 512. Specifically, the glue supply apparatus 20 is disposed on the upstream side in the conveying direction of the second board base paper 512 relative to a position where the first gypsum slurry 53 is supplied onto the second board base paper 512. The gluing failure inspection device 60 is disposed on the downstream side of a conveyance path of the gypsum slurry molded body 59 relative to the molding machine 58.

As illustrated in FIG. 2, the glue supply apparatus 20 includes the tank section 22 configured to store glue; the two supply ports 23A and 23B disposed near the ends of the second board base paper of the gypsum board and configured to supply the glue; and the two pump sections 24A and 24B disposed between the tank section 22 and the respective supply ports 23A and 23B. Rotary positive displacement pumps were used as the pump sections 24A and 24B.

The glue supply apparatus 20 further includes the controller 26 and the storage 27. The controller 26 selected glue supply conditions stored in the storage 27 in accordance with manufacturing conditions of the gypsum board to be manufactured by the gypsum board manufacturing apparatus 50, and controlled the rotational speed of the rotary positive displacement pumps based on the selected glue supply conditions. The controller 26 controlled the supply rate at which the glue was supplied from the tank section 22 to the supply ports 23A and 23B by the pump sections 24A and 24B.

Further, as illustrated in FIGS. 2 and 3, spatulas, serving as the spreading members 29A and 29B, were disposed in the vicinity of the supply ports 23A and 23B, and were configured to spread the supplied glue in the end regions of the second board base paper. As illustrated in FIG. 3, the rollers 31, serving as the support members, were disposed on the opposite side of the board base paper 21 from the spreading members 29A and 29B. As illustrated in FIG. 4B, the spatulas serving as the spreading members were provided with a plurality of rectangular-shaped cuts 292A in the end portions thereof facing the board base paper.

Hoses made of silicone resin were used as the second pipes 252A and 252B.

The gypsum board was manufactured by the gypsum board manufacturing apparatus having the above-described configuration. Then, the ratio of a time period during which gluing failures were detected by the gluing failure inspection device 60 to a time period from when the manufactured gypsum board reached the gluing failure inspection device 60 until when the manufactured gypsum board finished passing through the gluing failure inspection device 60 was calculated as a failure rate. The failure rate was 0.0005%.

Comparative Example 1

An apparatus having a configuration similar to that of Example 1 was used, except that the glue supply apparatus 20 did not include the controller 26 and the storage 27, valves were used instead of the pump sections 24A and 24B, and the degree of opening of the valves were manually adjusted.

A gypsum board was manufactured by the gypsum board manufacturing apparatus having a configuration similar to that of Example 1 except for the above-described points. Then, the ratio of a time period during which gluing failures were detected by the gluing failure inspection device 60 to a time period from when the manufactured gypsum board reached the gluing failure inspection device 60 until when the manufactured gypsum board finished passing through the gluing failure inspection device 60 was calculated as a failure rate. The failure rate was 0.05%.

Although the glue supply apparatus for a gypsum board, the gypsum board manufacturing apparatus, and the gypsum board manufacturing method according to the embodiment and the like have been described above, the present invention is not limited to the above-described embodiment and the like, and variations and modifications may be made without departing from the scope of the present invention recited in the claims.

This application is based on and claims priority to Japanese Patent Application No. 2021-010483, filed on Jan. 26, 2021, the entire contents of which are incorporated herein by reference.

DESCRIPTION OF THE REFERENCE NUMERALS

11, 12, 13 gypsum board
110, 120, 130 gypsum core
111, 121, 131, 511 first board base paper
112, 122, 132, 512 second board base paper
113, 123, 133 bonded portion
11A, 12A, 13A end
α edge angle
111A, 111B, 121A to 121C, 131A to 131C corner
20 glue supply apparatus for gypsum board
21 board base paper
21A, 21B end
211A, 211B end region
22 tank section
23A, 23B supply port
24A, 24B pump section
251, 251A, 251B first pipe
252A, 252B second pipe
253 third pipe
26 controller
27 storage
28 main tank section

29A, 29B spreading member
291 end portion
292A to 292C cut
293 adjacent region
31 roller
32 glue
50 gypsum board manufacturing apparatus
52 mixer
521, 522, 523 dispensing port
53 first gypsum slurry
54 second gypsum slurry
551, 552 delivery pipe
553 pipe line
56 roller coater
561 coating roller
562 receiving roller
563 residue removal roller
57 turning roller
58 molding machine
59 gypsum slurry molded body
591 first end
592 second end
60 gluing failure inspection device
61 light emitting unit
611 laser light
611A some light
611B remaining light
62 light receiving unit
63 determining unit

The invention claimed is:

1. A glue supply apparatus for a gypsum board for supplying glue to a board base paper of the gypsum board, the glue supply apparatus comprising:
- a tank section configured to store the glue;
- at least one supply port disposed near an end of the board base paper of the gypsum board and configured to supply the glue;
- at least one pump section disposed on a glue supply path between the tank section and the supply port; and
- a controller configured to increase a supply rate at which the glue is supplied from the tank section to the supply port, when a gluing failure is detected based on a light receiving position of received light from a bonded portion side of the board base paper,
- wherein the pump section is a positive displacement pump.

2. The glue supply apparatus for the gypsum board according to claim 1, wherein the at least one supply port includes supply ports disposed near respective ends of the board base paper of the gypsum board, and
- the at least one pump section includes pump sections arranged in parallel on glue supply paths between the tank section and the respective supply ports.

3. The glue supply apparatus for the gypsum board according to claim 1, wherein the controller is configured to control the supply rate at which the glue is supplied from the tank section to the supply port by the pump section, in accordance with a manufacturing condition of the gypsum board to be manufactured.

4. The glue supply apparatus for the gypsum board according to claim 3, further comprising:
- a storage configured to store a supply condition of the glue,
- wherein the controller is configured to select the supply condition of the glue stored in the storage and control the supply rate at which the glue is supplied from the tank section to the supply port by the pump section, in accordance with the manufacturing condition of the gypsum board to be manufactured.

5. The glue supply apparatus for the gypsum board according to claim 3, wherein the pump section is a rotary positive displacement pump, and the controller is configured to control a rotational speed of the pump section.

6. The glue supply apparatus for the gypsum board according to claim 1, further comprising:
- a spreading member configured to spread the glue on the board base paper.

7. The glue supply apparatus for the gypsum board according to claim 6, wherein the spreading member is a spatula, and
- the spatula has a cut in an end portion thereof facing the board base paper.

8. The glue supply apparatus for the gypsum board according to claim 1, wherein the pump section and the supply port are connected by a pipe, and
- at least an inner peripheral surface of the pipe is made of silicone resin.

9. The glue supply apparatus for the gypsum board according to claim 1, wherein the gluing failure is caused by a protrusion having a height of a predetermined level or more.

10. A gypsum board manufacturing apparatus comprising:
- the glue supply apparatus for the gypsum board according to claim 1.

11. A gypsum board manufacturing method comprising:
- causing the glue supply apparatus for the gypsum board according to claim 1 to supply the glue to the board base paper.

* * * * *